(12) United States Patent
Barros et al.

(10) Patent No.: US 9,325,809 B1
(45) Date of Patent: Apr. 26, 2016

(54) AUDIO RECALL DURING VOICE CONVERSATIONS

(71) Applicant: Expect Labs, Inc., San Francisco, CA (US)

(72) Inventors: Brett Barros, San Francisco, CA (US); Moninder Jheeta, Redmond, WA (US); George Samuel Kola, Concord, CA (US); Timothy Tuttle, San Francisco, CA (US)

(73) Assignee: Mindmeld, Inc., San Francisco, CA (US)

( * ) Notice: Subject to any disclaimer, the term of this patent is extended or adjusted under 35 U.S.C. 154(b) by 267 days.

(21) Appl. No.: 13/973,922

(22) Filed: Aug. 22, 2013

Related U.S. Application Data

(60) Provisional application No. 61/698,333, filed on Sep. 7, 2012.

(51) Int. Cl.
*G06F 15/16* (2006.01)
*H04L 29/06* (2006.01)

(52) U.S. Cl.
CPC ..................................... *H04L 67/42* (2013.01)

(58) Field of Classification Search
CPC ....... G06T 13/205; G06T 13/40; G10L 15/26; G10L 19/00; G10L 2015/088
See application file for complete search history.

(56) References Cited

U.S. PATENT DOCUMENTS

| | | | |
|---|---|---|---|
| 2008/0107255 A1* | 5/2008 | Geva et al. | 379/265.06 |
| 2009/0278851 A1* | 11/2009 | Ach et al. | 345/473 |
| 2009/0306981 A1* | 12/2009 | Cromack | G06F 17/30743 704/235 |
| 2011/0270609 A1* | 11/2011 | Jones et al. | 704/235 |
| 2013/0211826 A1* | 8/2013 | Mannby | 704/201 |

* cited by examiner

*Primary Examiner* — Umar Cheema
*Assistant Examiner* — Gregory P Tolchinsky
(74) *Attorney, Agent, or Firm* — Fenwick & West LLP

(57) ABSTRACT

Conversation information is provided to a conversation participant. Audio data is received a client device associated with a conversation participant. The client device maintains a buffer of received audio data, for instance audio data received in a previous interval of time. A recall request is received by the client device for information associated with the buffered audio data. The buffered audio data is analyzed responsive to the recall request to identify the requested information. The identified information is then presented at the client device.

17 Claims, 7 Drawing Sheets

AUDIO RECALL DURING VOICE CONVERSATIONS

CROSS REFERENCE TO RELATED APPLICATIONS

The application claims the benefit of Provisional Application No. 61/698,333, filed on Sep. 7, 2012, the content of which is incorporated herein by reference.

BACKGROUND

1. Field of Disclosure

This disclosure relates to the field of multi-party party communication, and more specifically, to the real-time synchronization, aggregation, and analysis of communication among multiple parties.

2. Description of the Related Art

As technological advances allow for greater simultaneous communication capabilities among parties that are not co-located, the need for the real-time analysis of communication data is increasing. Generally, for simultaneous communication (referred to herein as a "conversation"), each participant communicates using a communication device, such as a phone, a computer, a mobile device, and the like. In a typical communication setting, each participant may be located remotely from other participants, and may communicate using a different type of device than other participants. The ability to gather, synchronize, and analyze communication data in such a communication setting is hindered by the remoteness of the participants with respect to each other, and by the lack of a uniform communication device among the participants. In addition, conversations are in constant flux, with changes in topic, varying participation levels, and changes in participants occurring in real-time.

SUMMARY

The above and other issues are addressed by a method, non-transitory computer readable storage medium, and computer system for providing conversation information to one or more conversation participants. An embodiment of the method comprises receiving audio data associated with a conversation participant. A client device maintains a buffer of received audio data, for instance audio data received in a previous interval of time. A recall request is received for information associated with the buffered audio data. The buffered audio data is analyzed responsive to the recall request to identify the requested information. The identified information is then presented at the client device.

An embodiment of the medium stores executable computer program instructions for providing contextual content to one or more conversation participants. The instructions receive audio data associated with a conversation participant. The instructions cause a client device to maintain a buffer of received audio data, for instance audio data received in a previous interval of time. A recall request is received for information associated with the buffered audio data. The instructions analyze the buffered audio data responsive to the recall request to identify the requested information. The instructions present the identified information at the client device.

An embodiment of the computer system for presenting contextual content to a conversation participant includes a non-transitory computer-readable storage medium storing executable computer program instructions. The instructions include instructions for providing contextual content to one or more conversation participants. The instructions receive audio data associated with a conversation participant. The instructions cause a client device to maintain a buffer of received audio data, for instance audio data received in a previous interval of time. A recall request is received for information associated with the buffered audio data. The instructions analyze the buffered audio data responsive to the recall request to identify the requested information. The instructions present the identified information at the client device. The computer system also includes a processor for executing the computer program instructions.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
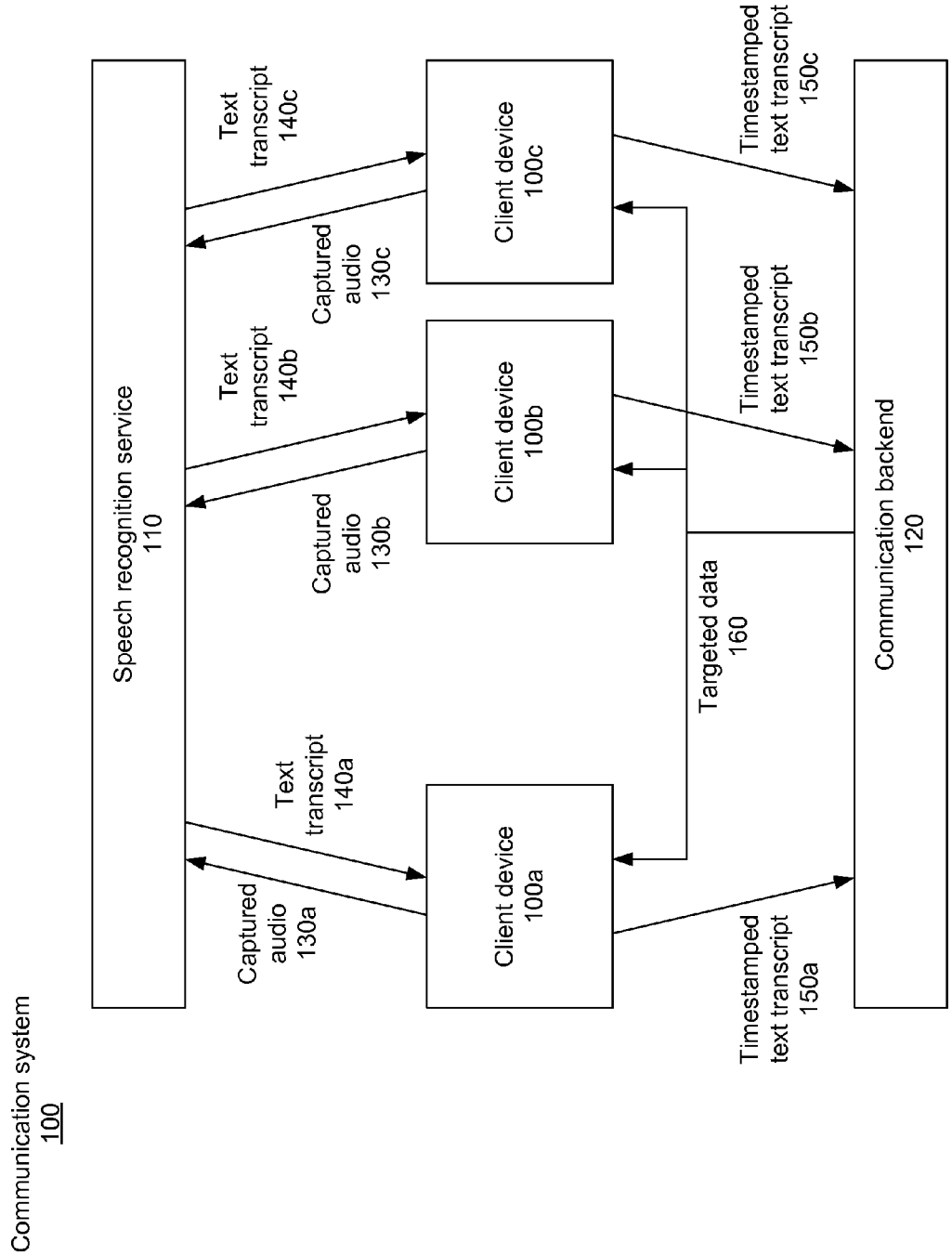
FIG. 1 is a high-level block diagram illustrating the operation of a multi-party communication synchronization system, according to one embodiment.

FIG. 1 is a high-level block diagram illustrating the operation of a multi-party communication synchronization system 100 (hereinafter "communication system 100"), according to one embodiment. FIG. 1 and the other figures describe the operation of the communication system 100 in the context of the capture and synchronization of audio communication data for the purposes of simplicity, though it should be noted that the principles described with regards to FIG. 1 apply equally to embodiments in which other types of communication data are captured and synchronized. For example, in addition to audio data, communication data captured and synchronized by the communication system can include video data, text data (such as instant messaging or email communications), action-based data (for instance, an action taken by a conversation participant with regard to a client device), or user state data (such as information describing or associated with conversation participants).

In the embodiment of FIG. 1, the communication system 100 includes a plurality of client devices (client device 105a, 105b, and 105c, collectively "client devices 105"), a speech recognition service 110, and a communication backend server 120. Although only three client devices are illustrated in the embodiment of FIG. 1, any number of users can use any number of client devices to participate in a conversation via the communication system 100. For instance, hundreds of users can participate in a conversation at once. In addition, although only one speech recognition service 110 is illustrated in the embodiment of FIG. 1, any number of speech recognition services can be used, for instance, one speech recognition service per client device 105.

Users of each client device 105 use the client device to participate in a conversation via the communication system. In one embodiment, the client devices communicate directly with the other client devices such that the device-to-device communications do not travel through the communication backend server 120. For instance, the client devices can include tablet computers equipped with microphones and running a Voice Over Internet Protocol (VOIP) application. In this embodiment, the VOIP application is configured to transmit the speech of a user of a first tablet to a second tablet for playback on speakers of the second tablet. In such an embodiment, multiple users can speak to and hear each other simultaneously and in real-time.

Each client device 105 is configured to capture audio data from the user of the particular client device, and is further configured to store, at the client device, the time at which the audio data is captured. Each client device processes and/or encrypts the captured audio, and sends the captured audio to a speech recognition service 110. For example, client devices 105a, 105b, and 105c transmit captured audio 130a, 130b, and 130c (collectively "captured audio 130"), respectively, to the speech recognition service. The speech recognition service analyzes the captured audio received from a client device, determines a text transcript representing the captured audio, and provides the text transcript to the client device. For example, the speech recognition service provides the text transcripts 140a, 140b, and 140c (collectively "text transcripts 140") to the client devices 105a, 105b, and 105c, respectively.

Upon receiving a text transcript 140 representing captured audio 130 from the speech recognition service 110, each client device 105 timestamps the text transcript with the time at which the captured audio associated with the text transcript was captured, and sends the timestamped text transcript to the communication backend 120. For example, client devices 105a, 105b, and 105c timestamp received text transcripts, and transmit the timestamped text transcripts 150a, 150b, and 150c (collectively "timestamped text transcripts 150"), respectively, to the communication backend. The communication backend synchronizes the timestamped text transcripts 150 and generates a relevance model based on the synchronized text transcripts. The communication backend then identifies relevant data targeted to the conversation among users of the client devices based on the relevance model, and provides the targeted data 160 to the client devices.

The communication backend 120 provides relevant data to the client devices 105 targeted to the communications between users of the client devices. For example, for communications involving a particular restaurant, the communication backend can provide a website, menus, prices, or ratings associated with the restaurant. Similarly, for conversations about a road trip to New Orleans, the communication backend can provide gas prices, maps, hotel information, and information about tourist attractions in New Orleans. The communication backend is configured to operate in conjunction with the client devices such that users can communicate seamlessly through the client devices and the communication backend can analyze the communications between the users in the background. Data targeted to the communications can be provided to the client devices for display on the client devices.

Figure 2:
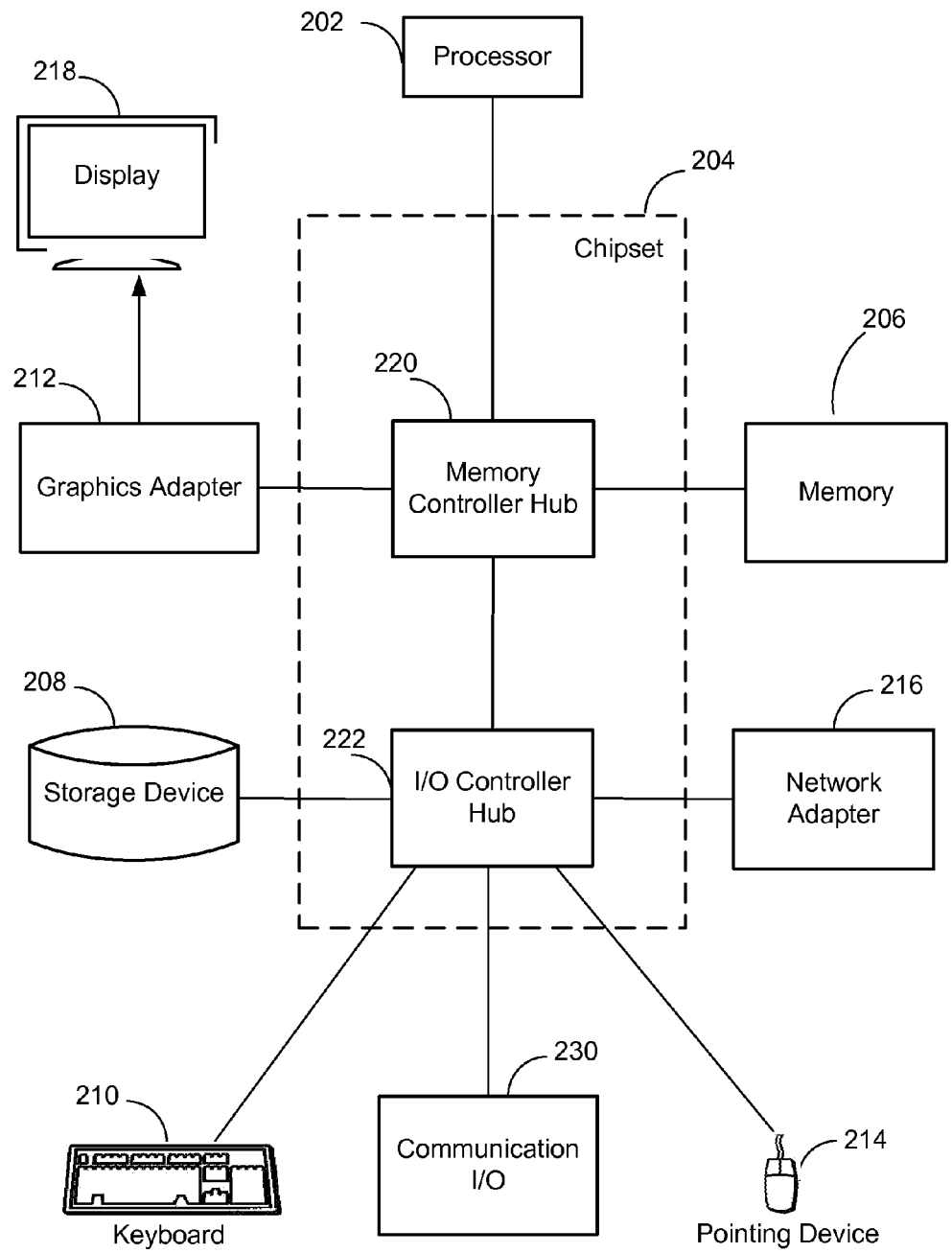
FIG. 2 is a high-level block diagram illustrating an example computer.

FIG. 2 is a high-level block diagram illustrating an example computer 200 for use as one or more of the entities of FIG. 1. The computer includes at least one processor 202 coupled to a chipset 204. The chipset includes a memory controller hub 220 and an input/output (I/O) controller hub 222. A memory 206 and a graphics adapter 212 are coupled to the memory controller hub, and a display 218 is coupled to the graphics adapter. A storage device 208, keyboard 210, pointing device 214, network adapter 216, and communication I/O 230 are coupled to the I/O controller hub. Other embodiments of the computer have different architectures.

The storage device 208 and memory 206 are non-transitory computer-readable storage mediums such as hard drives, compact disk read-only memories (CD-ROM), DVDs, or solid-state memory devices. The memory holds instructions and data used and executed by the processor 202. The pointing device 214 is a mouse, track ball, touch-sensitive display, or other type of pointing device, and is used in combination with the keyboard 210 to input data into the computer 200. The graphics adapter 212 displays images and other information on the display 218. The network adapter 216 couples the computer to one or more computer networks.

The communication I/O 230 includes devices configured to capture communication data from a user of the computer 200. For example, the communication I/O can include a microphone, a camera, a video camera, and the like. Communication data captured by the communication I/O is transmitted by the network adapter 216 via the I/O controller hub 222, is stored in the storage device 208 via the I/O controller hub, or is stored in the memory 206 via the memory controller hub 220. Prior to transmission or storage, the captured communication data can be processed by the processor 202.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, a client device 105 can be a desktop or laptop computer, a tablet computer, a mobile phone or other mobile device, a networked television or set-top box, or any other device capable of capturing communication data and communicating with the entities of FIG. 1. The speech recognition service 110 can be a computer, such as a desktop, laptop, tablet computer, or server; can be a software program executed on a computer, such as a native application on a client device, desktop, or mobile device; or can be a cloud-based application hosted on a datacenter of a web services company. The communication backend 120 can be a server (such as a blade server or web server), a datacenter, and the like. Each entity of FIG. 1 can include multiple computers, and multiple entities can be implemented in a single computer. It should be noted that some computers can lack various components described above, such as keyboards 210, graphics adapters 212, communication I/O 230, and displays 218.

Figure 3:
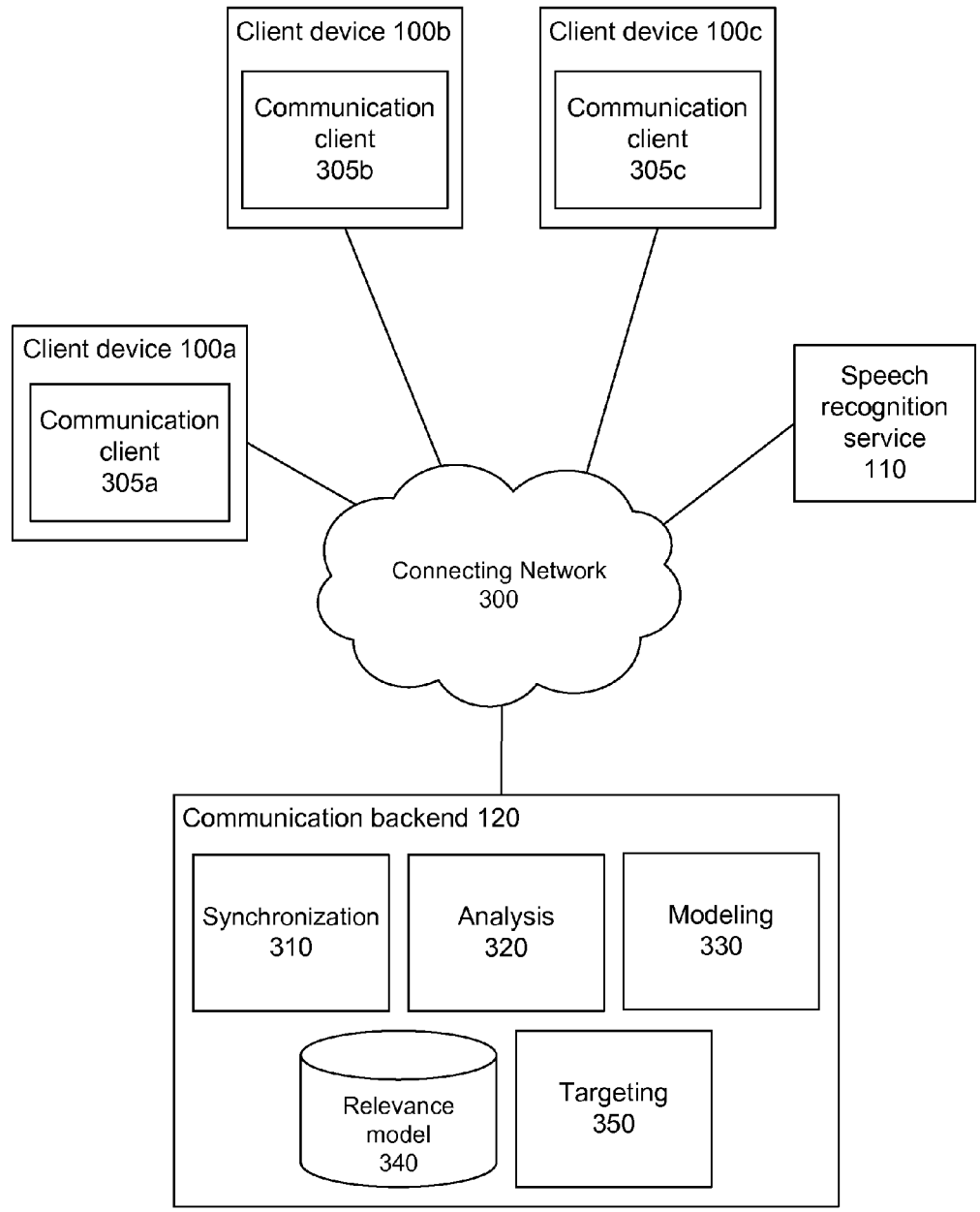
FIG. 3 is a high-level block diagram illustrating an operating environment for a multi-party communication synchronization system, according to one embodiment.

FIG. 3 is a high-level block diagram illustrating an operating environment of the multi-party communication synchronization system 100, according to one embodiment. The embodiment of FIG. 3 shows the plurality of client devices 105a, 105b, and 105c, each including a communication client 305a, 305b, and 305c (collectively "communication clients 305"). The embodiment of FIG. 3 further shows the speech recognition service 110 and the communication backend 120. The entities of FIG. 3 communicate via a connecting network 300. In other embodiments, the operating environment illustrated in FIG. 3 can include different components than those illustrated herein. For example, the speech recognition service can be implemented within each client device, for instance as an application operating on each client device, as described above.

The connecting network 300 provides a communication infrastructure between the client devices 105, the speech recognition service 110, and the communication backend 120. The connecting network is typically the Internet, but may be any network, including but not limited to a Local Area Network (LAN), a Metropolitan Area Network (MAN), a Wide Area Network (WAN), a mobile wired or wireless network, a private network, or a virtual private network. In addition, the connecting network can be an on-device network. For example, in an environment where the speech recognition service is implemented within a client device, the connecting network can include the on-device communication infrastructure between a communication client 305 on the client device and the speech recognition service on the device. In some embodiments, the connecting network includes multiple types of networks.

As discussed above, users use the client devices 105 to participate in a conversation via a communication system. A communication client 305 on a client device receives audio data from a user of the client device (for instance, speech of the user and accompanying background noise) and transmits the audio data to the communication clients on the client devices used by other participants to the conversation. A communication client on a client device can playback audio data received from other communication clients to a user of the client device. The communication client can be a native application, a web-based application, or any other entity capable of capturing, transmitting, receiving, and playing back audio data to and from other communication clients. In an example embodiment, a first client device can be a tablet computer, a second client device can be a mobile phone, a third client device can be a networked television, and the communication client on each client device can be an application that allows the users of the three client devices to speak to each other and to hear each other speak simultaneously or near-simultaneously.

The communication client 305 captures audio data from a user of a client device 105. For example, if a user of a client device says "Hi Frank, how are you", the communication client on the client device captures the audio data "Hi Frank, how are you". The captured audio data is stored in memory at the client device such as a memory buffer located at the client device. Captured audio data can be assigned an identifier, and the identifier can be stored in conjunction with the captured audio at the client device.

The communication client 305 captures audio data by sampling received analog signals associated with the audio data at a sampling rate and digitally representing the sampled audio signals. Captured audio can be stored in any format, for instance "raw"/uncompressed formats such as the pulse-code modulation (PCM) format, or compressed formats such as the MP3 format. The sampling rate at which audio data is sampled, the format used the digitally represent the audio data, and the bit depth and/or type of compression used to representing the audio data can be selected by a user of a client device 105, by the client device itself, by the communication client, or by any other entity. These sampling parameters can be selected based on network bandwidth considerations, based on the processing power of the client device, based on the requirements of the speech recognition service 110, or based on any other parameter related to the operation of the communication system 100. For example, audio data can be captured in the PCM format at a sampling rate of 16 kHz and using a bit depth of 16 bits.

The communication client 305 stores the captured audio data at the client device 105 as a series of audio frames. In one embodiment, each frame represents 20 ms of captured audio data; for captured audio data sampled at 16 kHz, each 20 ms frame represents approximately 320 individual samples of audio data. Frames are stored at the client device 105 in the order in which the audio data represented by the frames is captured. In one embodiment, the frames are indexed based on the time that each frame is captured. For example, if 50 frames of audio data are captured by the communication client 305 over the course of a user of the client device speaking, the 50 frames can be indexed with the indexes Frame_1 to Frame_50, with each successively captured frame indexed with a successive index.

The communication client 305 can perform frame-level processing on stored audio frames. Example processing options include noise cancellation, echo cancellation, and the like. The communication client can also determine whether or not each stored audio frame includes human speech by processing each frame and analyzing whether the audio data stored in each frame includes audio signals indicative of speech. Frames containing speech can be classified by the communication client as containing speech. For example, if a frame includes captured sound representing a human voice, the communication client can classify the frame as containing speech, whereas if the frame includes captured sound associated with background or other non-voice noise, the communication client can classify the frame as not containing speech.

The communication client 305 identifies stored sequences of consecutively ordered frames based on whether the frames contain speech. Such identified sequences are referred to herein as "segments" of speech frames. Each segment includes one or more consecutively ordered frames containing audio data representing human speech. A segment of speech frames can represent a single word spoken by a user, multiple spoken words, a spoken sentence, multiple spoken sentences, or any other amount of continuous speech.

The communication client 305 can identify segments in real-time, for instance by determining if each frame contains speech as it is captured. For instance, if the communication client determines that a first captured frame contains speech, the communication client can identify the first frame as the beginning of a segment, can identify all consecutive successively captured frames containing speech as part of the segment, and can identify the last captured frame containing speech before capturing a frame not containing speech as the end of the segment.

Upon identifying segments, the communication client 305 can encode the segments. The type of encoding can be predetermined, can be based on the encoding requirements of the speech recognition service, or can be based on the security requirements of the communication system 100 or the available bandwidth between the client device 105 and the speech recognition service. For example, the segments can be encoded into a 16-bit wide-band encrypted format in response to a determination that sufficient bandwidth is available for such a format and in response to a requirement that audio data be secure prior to transmission within the speech recognition service. Likewise, the segments can be encoded into a compressed format to reduce the amount of bandwidth required to send the segments in response to a determination that only limited bandwidth is available. Segments can be encoded individually, frame-by-frame, or can be concatenated together into a segment package and encoded together.

The communication client 305, in conjunction with capturing audio data from a user of the client device 105, also stores time data representing the time at which the audio data is captured. The communication client 305 associates the captured audio data with the stored time representing the captured audio data. For example, if a user of a client device says "Hi Claire, this is Jason" at 12:40:00 pm PST, the communication client on the client device associates the time [hours=12, minutes=40, seconds=00, am/pm=pm, time zone=PST] with the captured audio data representing the speech "Hi Claire, this is Jason". The association between stored time data and captured audio data can be made in a table stored at the client device that maps identifiers for audio data to time data representing the audio data. Time data can be associated with individual frames of audio data, with segments of audio data, with audio data representing a speech turn, with audio data representing an entire conversation, or with any other subset of audio data. It should be noted that time can be stored in any format with the audio data. In addition, it should be noted that a start time may be stored with a first frame in a first segment of audio data, and that time data associated with subsequent frames or segments may be determined by adding to the start time a time delta representing a known length of time associated with frames or segments.

The communication client 305 sends the identified segment to the speech recognition service 110. Alternatively, the communication client can identify multiple segments prior to sending any segments to the speech recognition service, for instance in order to identify segments comprising an entire speech turn of a user. The communication client can simultaneously send the multiple segments to the speech recognition service. The multiple segments can be sent to the speech recognition service in response to a threshold number of unsent segments being identified, in response to a threshold amount or percentage of memory or storage space at the client device 105 being filled by the identified segments, in response to the passage of a threshold amount of time since a previous segment was sent, in response to a determination that a user of the client device has paused or finished speaking, or in response to any other suitable factor.

The speech recognition service 110, upon receiving one or more segments of audio data, converts the received audio data into a text transcript of the received audio data. In one embodiment, the speech recognition service makes a text hypothesis for each word with the received audio data, which is a guess of a text transcript representing the word in the audio data of the received segments. The speech recognition service uses a speech recognition engine to process the received audio data and identify one or more words contained in the audio data. Words can be identified in the received audio data by comparing the received audio data to audio data representing known words. Words in the audio data are identified at a particular estimation of confidence. For instance, the speech recognition engine can process a first portion of audio data, and can identify the word "tree" in the first portion with a 90% confidence that the identification is correct, can identify the word "three" in the first portion with a 50% confidence, and can identify the word "free" in the first portion with a 30% confidence. Text hypotheses thus are combinations of a text transcript of an identified word and an estimated confidence that the word is identified in the text transcript correctly. Note that multiple text hypotheses can be made for each word within the received audio data.

The speech recognition service 110 produces one or more text hypotheses for each spoken word contained within the audio data of the received one or more segments. For each spoken word, the speech recognition service selects the text hypothesis associated with the highest estimated confidence. The speech recognition service combines the text associated with the selected text hypotheses to form a text transcript of the received audio data. The speech recognition service outputs the text transcript of the received audio data to the communication client 305 from which the corresponding audio data was received.

Upon receiving the text transcript of the one or more segments of audio data from the speech recognition service 110, the communication client 305 timestamps the text transcript with the time data associated with the corresponding audio data. As noted above, the communication client stores time data and associates the time data with audio data captured by the communication client. Thus, for one or more segments of audio data sent by the communication client to the speech recognition service, the communication client stores time data associated with the one or more segments of audio data. Upon receiving a text transcript of the one or more segments of audio data back from the speech recognition service, the communication client accesses the stored time data associated with the one or more segments of audio data. The accessed time data is used to timestamp the received text transcript. As used herein, "timestamping" refers to the association of time data and a text transcript. In one embodiment, timestamping includes the packaging of time data and a text transcript into a text transcript data structure. The time data in a timestamped text transcript represents the time at which the audio data represented by the text transcript was captured. The communication client sends the timestamped text transcript to the communication backend 120. It should be noted that in other embodiments, the timestamped text transcripts can include additional data, such as an identifier for the client device that captured the audio data, the identity of a user of the client device, information associated with a user context of the user, and the like.

The communication backend 120 receives timestamped text transcripts from one or more communication clients 305 via the connecting network 300. The communication backend can continuously receive timestamped text transcripts from the client devices 105 throughout the course of a conversation. For instance, every time a user of a client device speaks in a conversation, the communication client of the client device of the user can capture audio data from that user's speech, can send one or more segments of the captured audio data to the speech recognition service 120, can receive a text transcript from the speech recognition service, can timestamp the text transcript, and can send the timestamped text transcript to the communication backend. During the course of a conversation, this process can occur hundreds or thousands of times per client device.

In response to receiving the timestamped text transcripts during a conversation, the communication backend 120 synchronizes and analyzes the received timestamped text transcripts, generates a relevance model based on the synchronized and analyzed received timestamped text transcripts, and provides relevant data targeted to the conversation and based on the relevance model to the client devices. The communication backend includes a synchronization module 310, an analysis module 320, a modeling module 330, a relevance model storage module 340, and a targeting module 350 for performing these tasks. In other embodiments, the communication backend includes different, additional, or fewer modules than those described herein.

The synchronization module 310 synchronizes timestamped text transcripts received from a plurality of client devices 105 based on the time data associated with the timestamped text transcripts. In one embodiment, the synchronization module synchronizes the text transcripts in real time, as the transcripts are received. Synchronizing timestamped text transcripts includes ordering the timestamped text transcripts chronologically. For example, assume the communication backend receives the following timestamped text transcripts (each including a text transcript and a time) from a conversation between two participants:

| Text Transcript | Time |
| --- | --- |
| Sounds like fun | 5:23:29 pm PST |
| Hello | 5:23:09 pm PST |
| Hi Sam | 5:23:06 pm PST |
| Pretty good just got back from the baseball game | 5:23:24 pm PST |
| How are you doing | 5:23:15 pm PST |

The synchronization module 310 can re-order the timestamped text transcripts as follows:

| | Text Transcript | Time |
| --- | --- | --- |
| 1 | Hi Sam | 5:23:06 pm PST |
| 2 | Hello | 5:23:09 pm PST |
| 3 | How are you doing | 5:23:15 pm PST |
| 4 | Pretty good just got back from the baseball game | 5:23:24 pm PST |
| 5 | Sounds like fun | 5:23:29 pm PST |

It should be noted that the synchronization of text transcripts by the time data associated with the text transcripts can be more accurate than merely ordering timestamped text transcripts based on the times that the timestamped text transcripts are received at the communication backend 120, as the time of receipt of the timestamped text transcripts can be delayed. For instance, the communication clients 305 can delay sending one or more timestamped text transcripts, or network delay in the connecting network 300 can delay the delivery of one or more timestamped text transcripts. As the communication backend receives additional timestamped text transcripts resulting from a conversation, the synchronization module 310 continually synchronizes the timestamped text transcripts. In one embodiment, the synchronization module synchronizes the timestamped text transcripts in real-time, as the text transcripts are received from the client devices 105.

The analysis module 320 analyzes the synchronized text transcripts to identify conversation parameters. Conversation parameters describe attributes or characteristics of the conversation being conducted by users of the client device, and include important or frequently occurring words or phrases within the synchronized text transcripts identified by the analysis module. For instance, the analysis module can identify frequently occurring nouns and noun phrases, or verbs and verb phrases. In addition, the analysis module may identify terms associated with brands, products, services, or other commercial interests. In one embodiment, the analysis module analyzes the synchronized text transcripts to identify terms that appear in a table of terms determined to be important, for instance terms bid on by advertisers.

Conversation parameters can also include parameters other than words that appear in the synchronized text transcript. For instance, the conversation parameters can include a determined topic of the synchronized text, the moods of the participants of the conversation associated with the synchronized text, the relationship between the participants of such a conversation, a level of affinity between the participants of such a conversation, the context of each participant, characteristics of each participant, and the like. Such conversation parameters can be determined based on an analysis of the types and frequency of words used in the conversation, the characteristics or information associated with conversation participants (for instance, information from social networking system or communication program accounts of the conversation participants), and the like. For example, if terms associated with baseball occur frequently in a conversation, the analysis module 320 can determine that a first conversation parameter, the conversation topic, is "baseball." Similarly, if two participants in the conversation are associated as family members within a social networking system, the analysis module can determine that a second conversation parameter, the relationship between the two participants, is "family members." As the synchronization module synchronizes additional timestamped text transcripts resulting from a conversation, the analysis module 320 continually analyzes the additional synchronized text transcripts, for instance in real-time, to identify additional conversation parameters.

The modeling module 330 generates a relevance model based on the conversation parameters identified by the analysis module 320. The relevance model describes the relative importance of the conversation parameters to the conversation. In one embodiment, the relevance model assigns weights to some or all of the conversation parameters, with a greater weight indicating a greater relevance. In one embodiment, the relevance model weights terms within the identified conversation parameters based on the frequency of occurrence of the terms within the conversation, based on the identity or characteristics of any conversation participant, based on the type of client devices used within the conversation, based on the importance of the terms to advertisers, based on the importance of each type of conversation parameter, or based on any other aspect of the conversation. The relevance model can also weight conversation parameters based on other conversation parameters. For example, if the topic of the conversation is determined to be rock climbing, terms related to rock climbing can be weighted higher relative to terms not related to rock climbing. Likewise, if two conversation participants are engaged, terms related to engagements or weddings can be weighted higher relative to terms not related to engagements or weddings. The modeling module can update the relevance model in real time as additional text transcripts are received, synchronized, and analyzed at the communication backend 120. The relevance model is stored in the relevance model storage module 340.

The targeting module 350 selects data targeted to the conversation based on the relevance model stored at the relevance model storage module 340. Targeted data can include information, communication or other client device functionality, advertisements, and the like. Targeted data can be selected based on the conversation parameters determined in the relevance model to be most relevant to the conversation. For example, if the most relevant term within the relevance model is "surfing", the targeting module can select an ad associated with surfing conditions, a map of nearby surfing locations, directions to a surf shop, and the like. The targeted data can be selected based additionally on the identities or characteristics of the users of the client devices 105, based on a current speaker in a conversation, or based on any other conversation parameter. In one embodiment, the targeted data selected by the targeting module 350 is the data determined to be the most relevant to the conversation based on the relevance model.

Targeted data is provided by the targeting module 350 to the communication clients 305. In one embodiment, the targeting module selects targeted data to provide to all communication clients. Alternatively, the targeting module can select targeted data individually for each communication client. The targeting module can provide targeted data to the communication clients periodically, in response to a user action, in response to the passage of a threshold amount of time since targeted data was last provided to the communication clients, or based on any other suitable criteria. The communication clients can display selected targeted data to a user of the client device 105, for instance within a communication client interface.

Although the embodiment of FIG. 3 is described herein with reference to the capture, synchronization, and analysis of audio data, it should be noted that the principles described herein apply to other types of communication data as well. For example, the communication clients 305 can capture video data, and a video recognition service (not illustrated) can identify video characteristics (such as facial expressions, face, gesture, and object recognition, and the like). The video characteristics can be synchronized and analyzed by the communication backend 120, and conversation parameters based on the video characteristic analysis can be used to generate and/or update the relevance model. Similarly, other forms of communication data, such as text communication or action-based communication, and non-communication forms of data, such as user context information, can be synchronized, analyzed, and used to generate and/or update the relevance model.

Figure 4:
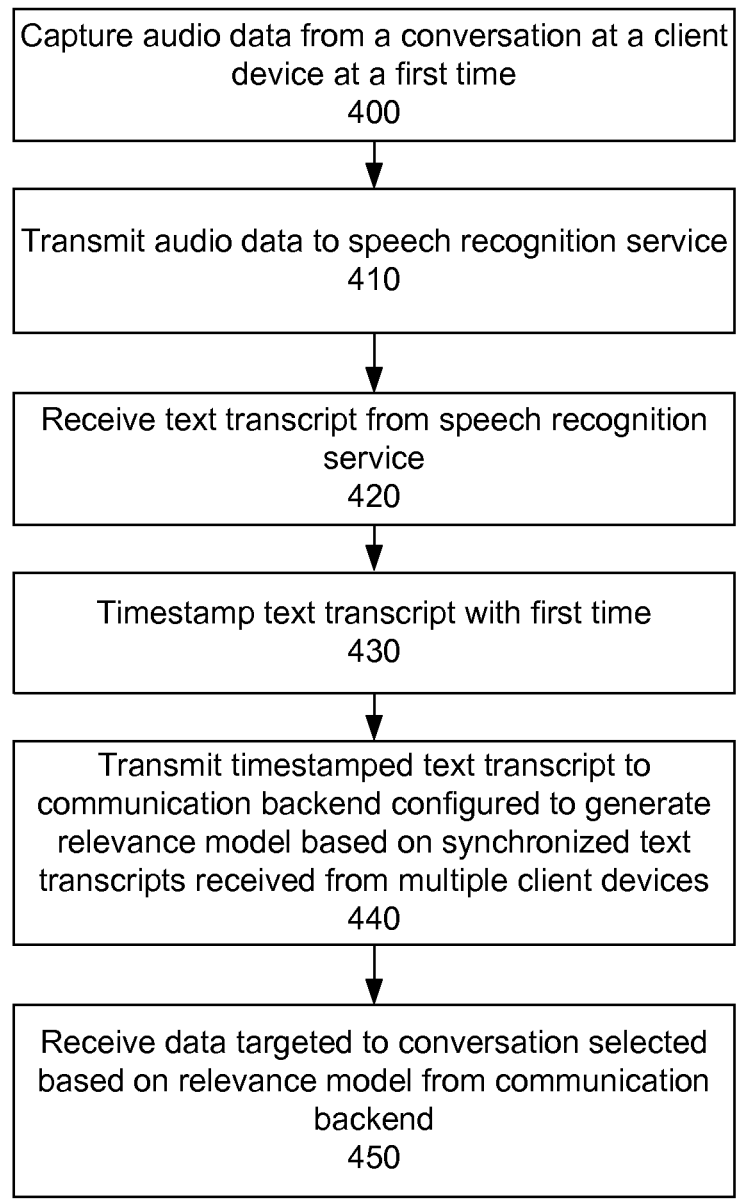
FIG. 4 is a flow chart illustrating a process for providing audio communication data to a communication backend for synchronization and analysis, according to one embodiment.

FIG. 4 is a flow chart illustrating a process for providing audio communication data to a communication backend for synchronization and analysis, according to one embodiment. Audio data is captured 400 at a client device at a first time. The audio data originates from a conversation participant in a conversation between one or more other conversation participants. The audio data is transmitted 410 to a speech recognition service. In response, a text transcript of the audio data is received 420 from the speech recognition service.

The text transcript is timestamped 430 with the first time. The timestamped text transcript is transmitted 440 to a communication backend. The communication backend is configured to generate a relevance model based on a synchronization of text transcripts received from multiple other client devices. For example, the multiple client devices can include one or more client devices used by other participants in the conversation, and the text transcripts can represent audio data captured at those other client devices (for instance, in response to speech from the other participants). Data targeted to the conversation and selected based on the relevance model is received 450 from the communication backend. The targeted data can include, for example, information associated with the conversation.

Figure 5:
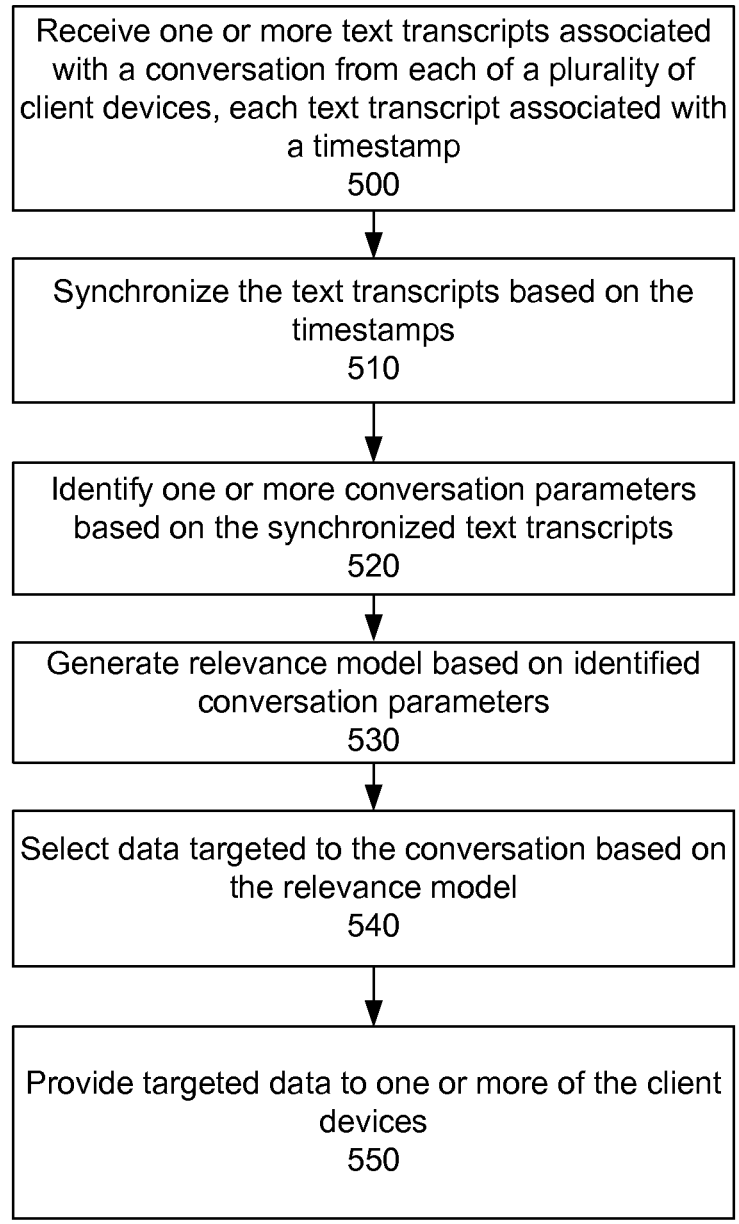
FIG. 5 is a flow chart illustrating a process for providing data targeted to a conversion to one or more client devices, according to one embodiment.

FIG. 5 is a flow chart illustrating a process for providing data targeted to a conversion to one or more client devices, according to one embodiment. Text transcripts are received 500 from client devices used by conversation participants to communicate with each other. Each text transcript is associated with a timestamp based on the time communication data associated with the text transcript was captured. The text transcripts are synchronized 510 based on the timestamps. For instance, the text transcripts are ordered, with each text transcript placed in the order based on the timestamp associated with the text transcript.

One or more conversation parameters are identified based on the synchronized text transcripts. Conversation parameters can include keywords, topics, relationships between conversation participants, and the like. A relevance model is generated 530 based on the identified conversation parameters. The relevance model describes the relative importance of the conversation parameters to the conversation. Data targeted to the conversation is selected 540 based on the relevance model, and is provided 550 to the one or more client devices. For instance, if the relevance model determines that a particular sports team is important to the conversation, information associated with the sports team, such as the team's record, roster, ticket sales information, and the like, are provided to the client devices for access and interaction by the conversation participants.

Figure 6:
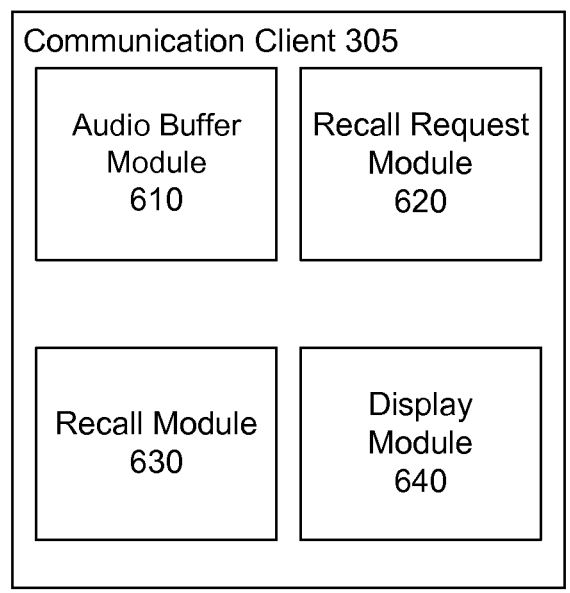
FIG. 6 illustrates an embodiment of a communications client including functionality for providing information related to recalled portions of a current conversation.

FIG. 6 illustrates an embodiment of a communications client 305 including functionality for providing information related to recalled portions of a current conversation. As shown, the communications client includes multiple modules. Other embodiments may include different and/or additional modules than the ones shown in FIG. 6. Moreover, functionalities may be distributed among the modules in a different manner than is described herein.

As shown, the communication client 305 includes an audio buffer module 610. This module maintains an audio buffer storing the audio data captured from the conversation participant using the client device 105 as well as time data representing the time at which the audio data was captured. In one embodiment, the audio buffer stores a recent portion of the current conversation being captured by the client device. The portion of the conversation stored by the audio buffer is available for recall.

In one embodiment the audio buffer is configured as a circular buffer that overwrites the oldest audio data as new audio data is received. For example, the audio buffer module 610 may maintain a circular buffer storing the most recent 10 seconds of captured audio. The size of the buffer, and hence the amount of audio data stored by the buffer and available for recall, may vary in different embodiments. The audio buffer module may maintain a buffer that stores 60 seconds of audio, 5 minutes of audio, or a different amount of audio.

The location of the buffer may also vary in different embodiments. The audio buffer module 610 may store the captured audio data in a buffer within the communication client 305 on the client device 105. The audio buffer module may also store the captured audio data in a buffer located on the communication backend 120 or on another server coupled to the connecting network 300.

A recall request module 620 detects a request by a conversation participant to obtain information related to a recalled conversation. Generally, the recall request is for information related to the portion of the conversation stored by the audio buffer modules 610 of the communication clients 305 used by the conversation participants. Since the recall request is for information related to a portion of the conversation that occurred in the past, the requested information is said to refer to a "recalled conversation."

The recall request module 620 may detect the recall request using one or more of a variety of techniques. In one embodiment, the recall request module provides a graphical button or other user interface (UI) element on a display of the client device 105 that the participant can select to initiate the information request. The recall request module may also detect the participant pressing a physical button or otherwise interacting with a physical interface on the client device. Such an interaction might entail the participant performing a particular gesture, such as a particular swiping motion, across the display of the client device, or moving/orienting the device in a particular manner.

Upon detecting a recall request, the recall request module 620 notifies the recall request modules of other communication clients 305 involved in the conversation that a request was received. For example, the recall request module may send messages to the other communication clients via the connecting network 300. Similarly, the recall request module may notify the communication backend 120 of the request, and the communication backend may, in turn, notify the other communication clients. Hence, when any conversation participant issues a recall request, the request is relayed to the communication clients used by the other participants. The request may be relayed to all communication clients involved in the conversation, or only to a subset of the communication clients.

A recall module 630 analyzes the recalled conversation in order to identify the requested information. In one embodiment, the recall module is activated when the recall request module 620 detects a recall request. The recall module accesses the recent portion of the conversation stored by the audio buffer module 610 of the communication client 305 to identify conversation parameters associated with that portion. In one embodiment, this analysis is performed by the recall modules of each communication client involved in the conversation, with each communication client analyzing the recent portion of the conversation stored by its associated audio buffer module. Thus, each recall module identifies conversation parameters in the portions of the conversation spoken by the respective individual users of the communication clients 305.

As part of the analysis, the recall module 630 converts the recent portion of the conversation stored by the audio buffer module 610 into a text transcript. For this conversion, the recall module may interact with the speech recognition service 110 in the manner described above. That is, the recall module may process the audio data into segments of speech frames and send the segments to the speech recognition service in order to obtain a corresponding text transcript. The recall module may then timestamp the transcripts with the associated time data. In other embodiments, the recall module converts the recent portion of the conversation into a text transcript using other techniques, such as by performing the speech recognition locally on the client device 100.

The recall module 630 processes the text transcript to identify conversation parameters for the recent portion of the conversation. As mentioned above, the conversation parameters describe attributes or characteristics of the conversation. The conversation parameters may include concepts, names, places, entities, phrases, etc. that were recently mentioned by the conversation participants.

The recall module 630 may process the text transcript by providing it to the communication backend 120. The communication backend, in turn, receives timestamped text transcripts from the various communication clients 305 of the conversation participants and combines them to identify conversation parameters based on all of the participants in the conversation. The communication backend synchronizes and analyzes the text transcripts to identify the conversation parameters for the recent portion of the conversation using the techniques described above.

The recall module 630 may also process the text transcript locally. In this embodiment, one of the communication clients 305 may receive the local text transcripts from the other communication clients involved in a conversation. For example, the communication client from which the recall request was initially received may receive text transcripts from the other communication clients. The recall module may then locally process the received text transcripts and its own local text transcript in order to identify the conversation parameters. This processing may involve providing the text transcripts to the communication backend 120 or synchronizing and analyzing the text transcripts locally, at the client device 100.

A display module 640 displays the conversation parameters for the recent portion of the conversation as the information in response to the recall request. The display module receives the conversation parameters from e.g., the communication backend 120 or the client device 100 on which the text transcripts were processed. The display module 630 then displays the conversation parameters to the participant using the client device 100. In one embodiment, the display module 630 presents a list box or other UI element on the display of the client device that lists the conversation parameters. Depending upon the embodiment, the display module 640 may display the conversation parameters on all or on only some of the client devices 100 associated with the conversation. For example, the display module 640 may display the conversation parameters on only the client device 100 from which the recall request was initially received. The display module 640 may also display the conversation parameters on a different display device, such as on a display of a computer 200 independent of the client devices 100.

The display module 640 may display only a subset of the conversation parameters. For example, the display module may display only certain types of conversation parameters, such as parameters identified as names, places, or entities.

In one embodiment, the display module 640 displays derivation information for the conversation parameters. The derivation information indicates an aspect of the conversation from which a specific conversation parameter was derived. The derivation information may include a timestamp indicating the time in the conversation in which the word or words from which the conversation parameter was derived was spoken. In addition, the derivation information may include the identity of the participant that spoke the word or words from which the parameter was derived.

Further, the display module 640 may provide functionality enabling a participant to interact with the conversation parameters. In one embodiment, the display module 640 enables a participant to save selected conversation parameters and associated derivation information. This functionality allows the participant to keep a record of the parameters mentioned at different points in the conversation, as well as the identities of the participants that mentioned the parameters and the times that the parameters were mentioned.

In addition, an embodiment of the display module 640 allows a participant to find and discover information related to the conversation parameters. For example, the participant may select a particular displayed conversation parameter and perform a search of the Web or another information repository for information related to the selected parameter. The participant can perform this search while the conversation is ongoing.

Figure 7:
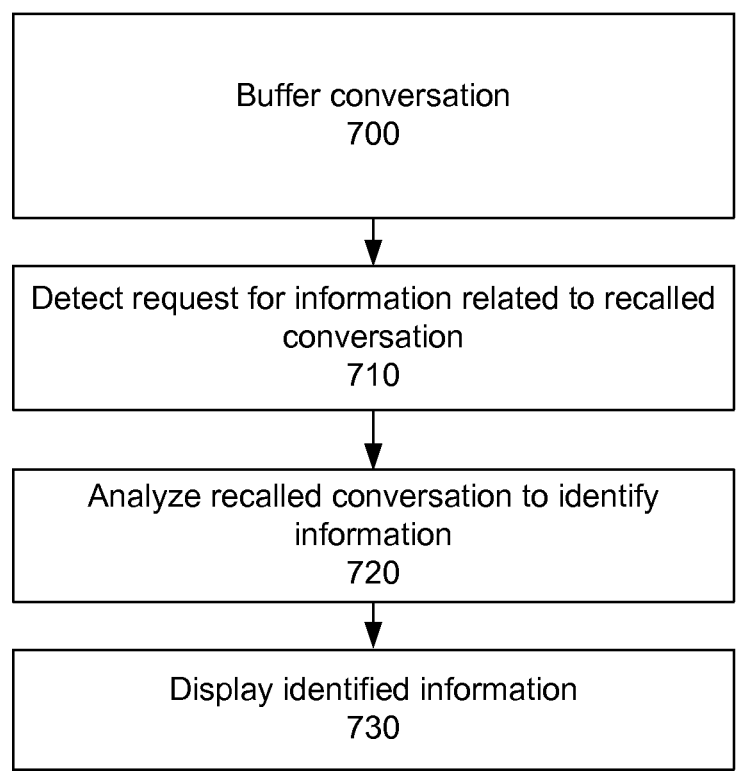
FIG. 7 is a flow chart illustrating a process for providing information related to recalled portions of a current conversation according to one embodiment.

FIG. 7 is a flow chart illustrating a process for providing information related to recalled portions of a current conversation according to one embodiment. Other embodiments may perform different or additional steps. Moreover, other embodiments may perform the steps in different orders. This description ascribes the steps of the method to the communication client 305. Some or all of the steps of the process may be performed by the communications backend or other entities in other embodiments.

As a conversation is ongoing, the communication clients 305 of the client devices 100 used by the conversation participants buffer 700 the conversation. In one embodiment, a communication client maintains an audio buffer storing a recent portion of the conversation captured by the client device on which it is executing. For example, the audio buffer may be a circular buffer that stores the last 10 or 60 seconds of audio from the conversation.

A communication client 305 detects 710 a recall request for information related to a recalled conversation. For example, a conversation participant may press a button on a UI of the participant's client device 100 to request the information. The request may be received from the participant using the same client device on which the communication client is executing. In addition, the request may be received from the communication client of another client device used by a different participant.

Upon detecting 710 the request, the communication client 305 analyzes 720 the recalled conversation to identify the requested information. In one embodiment, the communication client 305 accesses the recent portion of the conversation stored by the audio buffer to identify communication parameters associated with that portion. For this analysis, the communication client converts the recent portion of the conversation into a text transcript. This analysis may be performed by all of the communication clients used by the conversation participants to create multiple text transcripts for the conversation. These text transcripts may be synchronized and analyzed in order to identify conversation parameters for the recent portion of the conversation.

The communication client 305 displays 730 the identified conversation parameters in response to the request. The conversation parameters serve as the information related to the recalled conversation. A participant may view and interact with the displayed parameters to perform functions such as saving selected parameters and discovering information related to the parameters.

The communication client 305 thus allows a conversation participant to analyze a recent portion of a conversation in order to view information related to the conversation. The participant can save the information in order to keep a record of that portion.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for audio recall during voice conversations. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

The invention claimed is:

1. A computer-implemented method for providing conversation information to participants of a conversation, comprising:
   buffering, at a client device, audio data received from one or more conversation participants;
   receiving, at the client device, a recall request for information associated with the buffered audio data from a conversation participant;
   without pausing the conversation:
      notifying client devices associated with other conversation participants of the recall request, each client device associated with another conversation participant configured to buffer conversation data received from one or more conversation participants;
      receiving, from the notified client devices, information representative of buffered conversation data;
      analyzing, by the client device, the buffered audio data and the received information representative of buffered conversation data to identify one or more topics of the conversation associated with the analyzed data;
      identifying content associated with the identified one or more topics; and presenting, at the client device in real time, the identified content.

2. The computer-implemented method of claim 1, further comprising:
capturing, by the client device, audio data from a user of the client device participating in the conversation.

3. The computer-implemented method of claim 1, wherein buffering audio data comprises storing the received audio data in conjunction with time data representing a time at which the audio data was received.

4. The computer-implemented method of claim 1, wherein analyzing the buffered audio data and the received information representative of buffered conversation data comprises:
determining one or more conversation parameters associated with the conversation.

5. The computer-implemented method of claim 4, wherein determining one or more conversation parameters associated with the conversation:
converting the buffered audio data into a text transcript;
identifying keywords within the text transcript relevant to the conversation; and
identifying one or more topics of the conversation based on the identified keywords.

6. The computer-implemented method of claim 5, wherein the identified keywords comprise one or more of: nouns, noun phrases, verbs, and verb phrases that appear within the text transcript over a threshold frequency or a threshold number of instances; terms predetermined to be relevant; terms dynamically determined to be relevant; and terms associated with brands, products, services, or other commercial interests.

7. The computer-implemented method of claim 5, wherein identifying one or more topics of the conversation based on the identified keywords comprises:
identifying a topic keyword based on the identified keywords, the topic keyword not included in the identified keywords, wherein an identified topic of conversation comprises the identified topic keyword.

8. The computer-implemented method of claim 4, wherein determining one or more conversation parameters associated with the conversation comprises:
accessing one or more of the buffered audio data and characteristics or information associated with conversation participants; and
determining one or more of relationships between conversation participants, measures of affinity between conversation participants, and a context for conversation participants.

9. The computer-implemented method of claim 4, wherein the determined one or more conversation parameters comprise one or more of: concepts, names, places, entities, and phrases.

10. The computer-implemented method of claim 1, wherein the client device and the one or more notified client devices are configured to provide text transcripts of audio data buffered by each client device to a central server, and further comprising:
receiving, from the central server, one or more conversation parameters, the central server configured to analyze the text transcripts provided by the client device and the notified client devices to identify the one or more conversation parameters.

11. The computer-implemented method of claim 1, wherein presenting the identified content comprises displaying the identified content on a client device display.

12. The computer-implemented method of claim 11, wherein the displayed content includes one or more of: a time that a portion of audio data associated with the requested information was spoken by a conversation participant or captured by the client device, an identity of a conversation participant associated with the requested information, and information derived from the identified conversation parameters.

13. The computer-implemented method of claim 11, wherein presenting the identified content comprises presenting an interface configured to allow a user of the client device to perform a search based one or more identified conversation parameters.

14. A non-transitory computer-readable storage medium storing executable computer program instructions for providing conversation information to participants of a conversation, the instructions performing steps comprising:
buffering, at a client device, audio data received from one or more conversation participants;
receiving, at the client device, a recall request for information associated with the buffered audio data from a conversation participant;
without pausing the conversation:
notifying client devices associated with other conversation participants of the recall request, each client device associated with another conversation participant configured to buffer conversation data received from one or more conversation participants;
receiving, from the notified client devices, information representative of buffered conversation data;
analyzing, by the client device, the buffered audio data and the received information representative of buffered conversation data to identify one or more topics of the conversation associated with the analyzed data;
identifying content associated with the identified one or more topics; and
presenting, at the client device in real time, the identified content.

15. The computer-readable storage medium of claim 14, wherein the client device and the one or more notified client devices are configured to provide text transcripts of audio data buffered by each client device to a central server, and the instructions performing further steps comprising:
receiving, from the central server, one or more conversation parameters, the central server configured to analyze the text transcripts provided by the client device and the notified client devices to identify the one or more conversation parameters.

16. A computer system for providing conversation information to participants of a conversation, comprising:
a non-transitory computer readable storage medium storing executable computer program instructions comprising instructions for:
buffering, at the computer system, audio data received from one or more conversation participants;
receiving, at the computer system, a recall request for information associated with the buffered audio data from a conversation participant;
without pausing the conversation:
notifying client devices associated with other conversation participants of the recall request, each client device associated with other conversation participants configured to buffer conversation data received from one or more conversation participants;
receiving, from the notified client devices, information representative of buffered conversation data;
analyzing, by the client device, the buffered audio data and the received information representative of buffered conversation data to identify one or more topics of the conversation associated with the analyzed data;

identifying content associated with the identified one or more topics; and presenting, at the client device in real time, the identified content; and a processor for executing the computer program instructions.

17. The computer system of claim 16, wherein the computer system and the one or more notified client devices are configured to provide text transcripts of audio data buffered by the computer system and each notified client device to a central server, the instructions further comprising instructions for:

receiving, from the central server, one or more conversation parameters, the central server configured to analyze the text transcripts provided by the computer system and the notified client devices to identify the one or more conversation parameters.

* * * * *